United States Patent [19]

Laignel et al.

[11] 4,054,262
[45] Oct. 18, 1977

[54] COCK HAVING A ROTATING VALVE REMOVABLE FROM ABOVE

[75] Inventors: Raymond A. Laignel, Ginestas; Patrick F. Mommeja, Arles, both of France

[73] Assignee: Constructions Metalliques de Provence, Perret, France

[21] Appl. No.: 701,815

[22] Filed: July 1, 1976

[30] Foreign Application Priority Data

July 11, 1975 France .................................. 75.22455

[51] Int. Cl.² ............................................. F16K 27/06
[52] U.S. Cl. ...................................... 251/367; 251/315
[58] Field of Search ................................ 251/367, 315

[56] References Cited

U.S. PATENT DOCUMENTS

| 3,154,094 | 10/1964 | Bredtschneider et al. | 251/315 |
| 3,171,429 | 3/1965 | Sturmer et al. | 251/315 |
| 3,214,131 | 10/1965 | Boldt et al. | 251/315 |
| 3,269,692 | 8/1966 | Shafer | 251/315 |
| 3,415,488 | 12/1968 | Priese et al. | 251/315 |
| 3,445,087 | 5/1969 | Priese et al. | 251/315 |
| 3,480,253 | 11/1969 | Priese et al. | 251/315 |
| 3,678,556 | 7/1972 | Shafer | 251/315 |

FOREIGN PATENT DOCUMENTS 725,648    8/1965    Italy .................................. 251/315

Primary Examiner—William R. Cline
Assistant Examiner—H. Jay Spiegel
Attorney, Agent, or Firm—Lewis H. Eslinger

[57] ABSTRACT

A cock valve includes a hollow body having first and second opposite end portions with the first end portion having a circular upper aperture formed therein. A valve is rotatably positioned within the body for rotation about an axis extending between said first and second end portions of the housing. The valve has first and second pivot members therein respectively located adjacent the first and second end portions of the housing and is dimensioned for removal through the aperture in the first end portion of the housing. A removable cap is mounted on the housing for closing the aperture and receiving the first pivot member of the valve. The hollow body has a generally annular groove formed therein about the opening with the groove opening inwardly towards the opening and the axis of rotation of the valve. An open resilient ring having internal and external surfaces is mounted in the groove with its external surface positioned therein, to serve to keep the cap in place. The internal surface of the ring is precision machined and defines a frusto-conical bearing surface diverging outwardly from the axis of rotation of the valve and away from the second end portion of the housing; and the cap has a precision machined peripheral bearing surface of truncated conical shape which is generally concentric with the axis of rotation of the valve and converges towards the axis away from the second end portion of the housing opposite the frusto-conical bearing surface of the ring. A cap centering ring is also provided having generally conical internal and external surfaces which converge towards each other and towards the second end portion of the housing. The cap centering ring is positioned with its external surface bearing upon the internal surface of the resilient ring and its internal surface bearing against the truncated conical surface of the cap.

6 Claims, 1 Drawing Figure

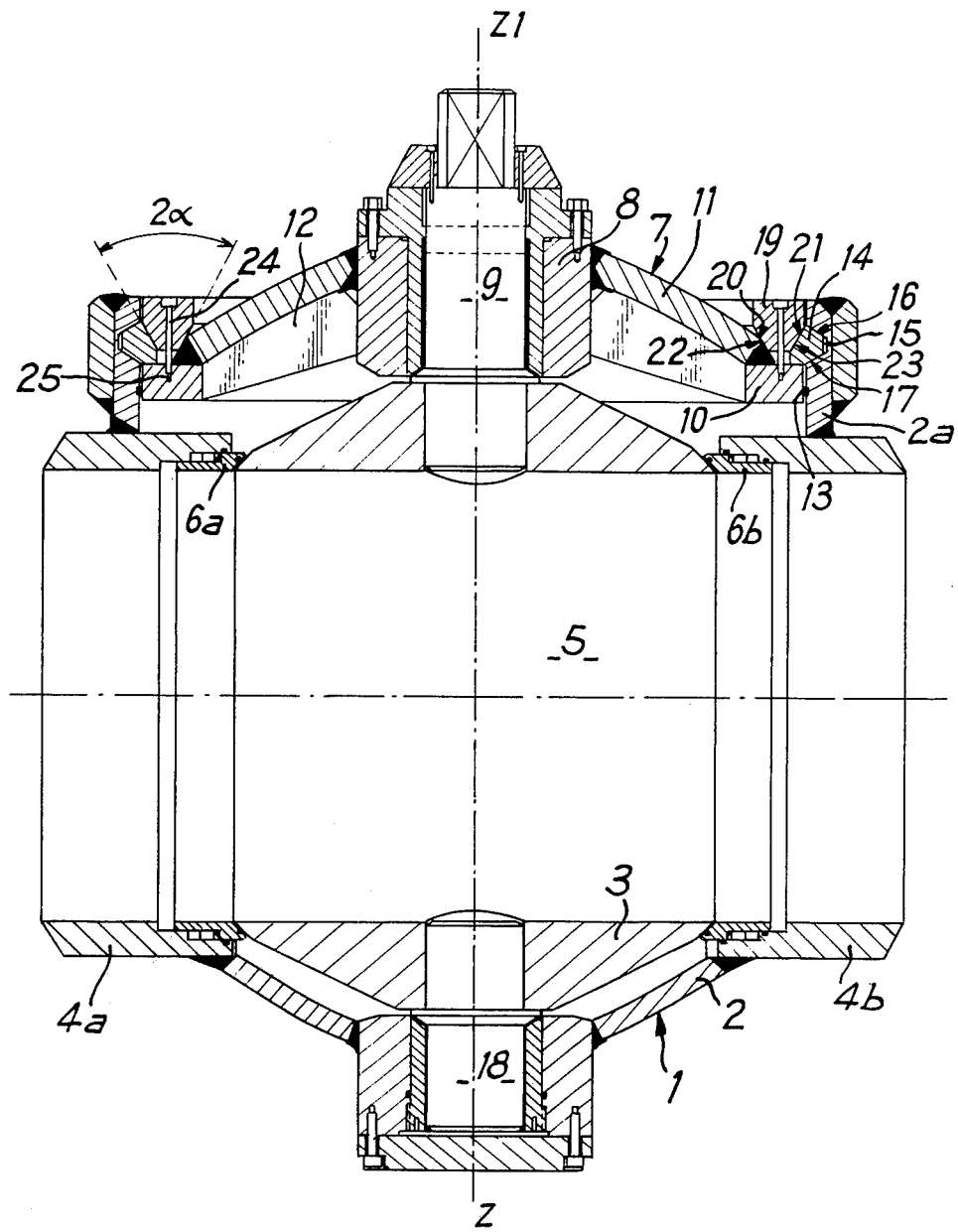

COCK HAVING A ROTATING VALVE REMOVABLE FROM ABOVE

The invention relates to cocks having rotating valves removable from above.

Cocks equipped with rotating closure means, known as valves, of small diameter are already known, in which the valves may be removed from above (i.e. from the top of the cock), and which are fitted this purpose with a detachable cap secured to the body of the cock by means of a bolted flange.

With increasing diameters, and increasing fluid pressures, very large flanges have to be used in order to withstand the forces produced by the pressure of the fluid. This also leads to an increase in the size and number of the bolts.

In order to overcome this disadvantage, it is has already been proposed that the cock have a cap which fits into the body thereof and is held in place by an open resilient ring accommodated in a groove in the internal periphery of the the body, and above the cap.

At present, use is made of split rings of rectangular or square cross section located in similarly rectangular grooves. A ring of this kind, having a rectangular or square cross section, has the advantage of withstanding the total thrust applied to the cap.

On the other hand, such split rings also have certain disadvantages. Vertical play inevitably exists between the groove and the ring, and the cap therefore also has vertical play. Thus the valve itself may also move vertically and may possibly leak.

Moreover, a ring of this kind, having a square or rectangular cross section, does not in any way ensure that the cap is centered. On the other hand the cap must have a relatively large amount of play, of the order of a millimetre, in relation to the body of the cock, to enable the cap to be fitted into the body, this play being taken up by a sealing fitting. The result of this is that the upper pivot bearing of the valve, which is carried by the cap, may also move slightly. This may lead to misalignment of the pivots or to stresses resulting in the valve becoming jammed and immovable, the results of which could be very serious.

It is the purpose of the present invention to overcome these disadvantages.

A cock according to the invention includes
a hollow body having a circular upper aperture;
a valve which is located in the body, and which rotates about a vertical axis consisting of an upper and lower pivot, with the valve being removable through the aperture;
a removable cap which closes off the said aperture and through which the said upper pivot passes;
and an open resilient ring which has an internal lateral surface and an external lateral surface, and which is accommodated in part in a groove cut into the periphery of the said aperture in such a manner as to keep the said cap in place.

The purpose of the invention is achieved by means of a cock of this type in which the internal lateral surface of the ring is a precision-machined, conical bearing surface which turns about the axis of rotation of the valve, and which diverges upwardly; and in which the cap comprises a precision-machined peripheral, truncated-conical bearing surface, which turns about the axis of rotation of the cock, and which converges upwardly.

A cock according to the invention also comprises a cap-centering ring comprising conical internal and external lateral surfaces which converge downwardly, the external surface bearing against the conical internal surface of the ring, whereas the internal surface bears against the truncated-conical bearing surface of the cap.

The conical lateral surfaces of the centering rings should preferably form between themselves an angle of between 20° and 60°.

The centering ring is also preferably provided with holes parallel with the axis of the ring and arranged in a circle centred on the axis, the holes accommodating locking screws which are screwed into threaded holes arranged around the periphery of the cap in a circle centred on the axis thereof.

The groove accommodating the locking ring is preferably of trapezoidal cross section, the ring having a biconical external surface engaging with the groove.

The result of the invention is a new product in the form of a cock having a rotating, preferably spherical, valve which is removable from above.

Cocks according to the invention have the following advantages.

The cap, locked by an open ring, is smaller and lighter than a bolted flange, especially in the case of a large diameter cock located in a line carrying a fluid under high pressure.

The cock is accurately centered by the biconical locking ring bearing on the truncated-conical surface of the cap, and it is kept in this centred position by means of locking screws which connect the locking ring to the cap.

One important advantage of the cocks according to the invention is that the biconical locking ring provides mechanical continuity between the body of the cock and the cap, which thus assists in withstanding the often high stresses passing from one pipe section to another through the cock.

Furthermore, the centering ring transmits, from the cap to the body of the cock, the very high loads applied by the upper pivot to the cap when the valve is closed.

Still another advantage is that the biconical ring makes it possible to compensate for the slight ovality in the body of the cock which may arise, when the cap is removed, as a result of the forces applied to the body by the pipelines. Any such ovality may make it difficult to refit the cap and may lead to leakage of the joint between the periphery of the cap and the body. Keeping the cap accurately centred in relation to the axis of the body also avoids any bending of the axis of rotation of the valve, which might cause the lower pivot to jam. The biconical shape of the external surface of the split ring, which co-operates with the trapezoidal section of the groove accommodating this ring, ensures accurate vertical positioning of the cap abutting against the ring. The angle of between 20 and 60° between the two lateral faces of the biconical ring prevents possible jamming of the ring which would make dismantling difficult. The installation and removal of the cock cap according to the invention is facilitated by using an open ring and a centering ring consisting of a plurality of adjacent segments with staggered joints.

The following description refers to the drawing attached hereto which represents an example of embodiment of the cock according to the invention, with no limiting characteristics.

In this drawing, the single FIGURE illustrates a vertical section through a cock having a spherical valve according to the invention.

This figure shows a cock 1 consisting of a hollow body 2 containing a spherical valve 3 pivoting about vertical axis $z$ $z1$. Body 2 comprises two adapters 4a, 4b to which pipelines are connected. A bore 5 traverses cock 3 from one end to the other.

The seal between the valve and the body is achieved by means of two sliding seats 6a, 6b.

When these seats are retracted, valve 3 may be engaged in the body or removed therefrom from above. A cock of this kind is usually known as a "top-entry" cock. In order to allow the valve to pass, body 2 is provided with an easily detachable cap 7 which carries, at its centre, a bearing 8 in which upper pivot 9 of the valve rotates.

Cap 7 comprises a base ring 10 to which is welded a sheet-metal dome 11 connecting the ring to bearing 8. Radial gussets 12 reinforce this structure. The outside diameter of ring 10 is slightly smaller than the inside diameter of the upper end 2a of body 2, which is in the form of a cylinder having a central axis $z$ $z1$. The play between the edge of the cap is one millimeter, for example, in order to allow the cap to be engaged freely in the body itself, should the latter be slightly deformed.

A seal 13, for example a metallic seal, located in a groove, provides a seal between the cap and the body.

Once the cap has been engaged in body 2a, it is locked with an open resilient ring 14, in the form of a segment, which is accommodated in a groove 15 cut into the periphery of collar 2a. Ring 14 may be in one piece or may consist of a plurality of sections placed together.

According to one characteristic of the invention, groove 15 is trapezoidal in cross section, and ring 14 has two conical surfaces 16, 17 on its outer side, the said conical surfaces bearing upon the lateral walls of trapezoidal groove 15. Thus the vertical positioning of ring 14 is highly accurate, as is the positioning of cap 7 which is stopped by ring 14. The size of the latter is such that it withstands the thrust of the cap due to fluid pressure.

Although a ring 14 of this kind, having a biconical surface, ensures accurate vertical positioning of the cap, it does not centre the cap or keep it centered, and accurate centering is absolutely essential if seal 13 is to be fluid-tight and if axis $z$ $z1$ is to be properly aligned, since any eccentricity of the cap will result in misalignment between upper pivot 9 and lower pivot 18 of the valve. This may distort the lower pivot and result in jamming of the valve.

According to another characteristic of the invention, centering of the cap is achieved by means of a centering ring 19 fitted into collar 2a of the body of the cock with a relatively large amount of play - of the order of several millimeters.

This ring has two conical lateral surfaces 20, 21 converging downwardly. These two surfaces are preferably substantially symmetrical in relation to the median cylinder, and they enclose an angle 2 Greek letter alpha of between 20° and 60°.

Surface 20 bears upon a truncated-conical bearing surface 22, centered with respect to axis $z$ $z1$, which is precision-machined at the periphery of the cap, above base ring 10. This bearing surface converges upwardly and is located substantially on a level with resilient ring 14.

Surface 21 bears upon the internal surface of ring 14, which is also a precision-machined conical surface 23 diverging upwardly.

The engagement of ring 19 between concial surface 23 of ring 14 and truncated-conical bearing surface 22 of the cap centres the cap in relation to the ring, the latter being itself centred in relation to the body as a result of the trapezoidal shape of the groove and of the outer surface of the ring.

Ring 19, bearing upon the cap and upon ring 14, ensures mechanical continuity between the body and the cap, and provides resistance to the loads transferred by upper pivot 9 to the cap when the cock is closed. In the case of large cocks installed in conduits carrying high-pressure fluids, of the order of 100 bars, these loads are very high, of the order of several hundreds of tons.

Once the cap has been centered by the fitting of ring 19, screws 24 are inserted into the holes drilled through ring 19, the screws being screwed into threaded holes 25 in ring 10 arranged in a circle around axis $z$ $z1$. The cap is thus centred and locked.

Screws 24 keep the cap against ring 14 when no pressure is applied to the internal surface of the cap.

It is to be understood that the various components parts of the the cock described above by way of example may be replaced by equivalent elements well known to one skilled in the art, without departing from the scope of the invention.

We claim:

1. A cock having a rotating valve and comprising: a hollow body having first and second opposite end portions with said first end portion having a circular aperture formed therein; a valve rotatably positioned in said body for rotation about an axis extending between said first and second end portions of the housing, said valve having first and second pivot members thereon respectively located adjacent said first and second end portions of the housing, and said valve being dimensioned for removal through said aperture; a removable cap mounted on said housing for closing said aperture and receiving said first pivot member of said valve; said hollow body having a generally annular groove formed therein about said opening with said groove opening inwardly towards said axis; and an open resilient ring having an internal surface and an external surface with said external surface being received in said groove for keeping said cap in place, said internal surface of said resilient ring being precision machined and defining a frustro-conical bearing surface diverging outwardly from said axis and away from said second end portion of the housing, and said cap having a precision-machined peripheral bearing surface of truncated conical shape generally concentric with said axis of the valve and which converges towards the axis away from said second end portion of the housing opposite said frustro-conical bearing surface; and a cap-centering ring having generally frustro-conical internal and external surfaces which converge towards each other and towards said second end portion of the housing; said cap centering ring being positioned with its external surface bearing upon said internal surface of said resilient ring and its internal surface bearing against said truncated conical bearing surface of said cap.

2. A cock according to claim 1, in which said internal and external surfaces of the centering ring enclose an angle of between 20° and 60°.

3. A cock according to claim 1, in which said centering ring has holes formed therein parallel with said axis and arranged around a first circle centered upon said axis, said cap having threaded holes formed therein arranged around a second circle of the same diameter as the first circle and cap-locking screws engaged in said holes in the centering ring and being screwed into said threaded holes in the cap.

4. A cock according to claim 1, in which said groove has a trapezoidal cross section including an open base facing said opening and said external surface of said resilient ring has two frustro-conical surfaces formed thereon respectively mating with the sides of said groove.

5. A cock according to claim 1, in which said cap comprises a base ring, a sheet-metal dome having a concave surface directed towards the valve, and a bearing mounted in said dome for receiving said first pivot member of said valve, said dome connecting said bearing to said base ring in coaxial relation thereto, said cap also including at its periphery said truncated conical bearing surface which is precision machined, and said truncated conical bearing surface being centered upon said axis of the bearing and of said base ring.

6. A cock according to claim 5, in which said truncated-conical bearing surface of said cap defines an angle of between 10° and 30° with respect to said axis.

* * * * *